Patented Jan. 7, 1936

2,026,546

UNITED STATES PATENT OFFICE 2,026,546

FREE CUTTING ALLOYS

Louis W. Kempf and Walter A. Dean, Cleveland, Ohio, assignors to Aluminum Company of America, Pittsburgh, Pa., a corporation of Pennsylvania No Drawing. Application September 18, 1933, Serial No. 689,884

3 Claims. (Cl. 75—1)

This invention relates to aluminum base alloys and it is particularly concerned with an alloy having improved machining properties compared to the pure metal.

The metal aluminum has many inherent advantageous properties such as lightness in weight, good thermal and electrical conductivity, favorable corrosion resistance, and the like, which adapt the metal to a variety of uses. For certain applications, however, it is necessary to finish the metal article by such machining operations as drilling, boring, planing, or shaping. Commercially pure aluminum does not lend itself well to such operations but tends to drag or collect under the edge of the cutting tool with a resultant gouging action. An uneven and dull surface is usually produced by the ordinary machining operations and such a surface is obviously undesirable both from the standpoint of appearance and dimensional accuracy. The speed at which the cutting may be done is also greatly reduced because of the tendency of the metal to drag under the tool.

It is an object of our invention to improve the machinability of aluminum by the addition thereto of an element which does not substantially alter the outstanding physical properties of the metal. It is especially an object of our invention to increase the speed of cutting aluminum and yet obtain a brighter smoother machined surface than heretofore possible.

Our invention is predicated upon the discovery that the addition of from about 0.05 to 10 per cent of bismuth and/or thallium to aluminum greatly increases the ease with which the metal can be cut. In machining an aluminum alloy containing either of these two elements, it has been found that shorter, more breakable chips are produced, that a cleaner, smoother, brighter surface is left on the metal, and that the alloy can be cut more rapidly than the pure or unalloyed aluminum. Such an improvement in machining quality without substantial loss in other properties makes the alloy particularly well adapted to the manufacture of electrical equipment. For the purpose of our invention the elements bismuth and thallium are considered to be substantially equivalent in respect to their influence on the machinability of aluminum.

The machinability of the aluminum-thallium and/or bismuth alloys varies with the heavy metal content and the amount of cold working that the alloy receives immediately prior to being machined. For some purposes it is desirable to employ a minimum amount of these metals, particularly when only a little machining is to be done on an article. On the other hand, if the article is to be largely shaped by machining operations (as in the case of the manufacture of nuts, bolts, or screws), it is desirable to use a greater proportion of bismuth and/or thallium and thereby increase the ease and rapidity of cutting the metal. We have found, for example, that an amount of bismuth up to about 2 per cent is satisfactory for articles not requiring much machining. An aluminum-bismuth alloy containing about 1.5 per cent bismuth has been found to be satisfactory in cases where a moderate amount of machining is to be done. For products made on automatic machines, better results may be obtained by using between about 2 and 6 per cent of the element. When more than about 6 per cent is added to aluminum, there is likely to be a decrease in strength, but this tendency is compensated for by a further improvement in machinability. As much as 10 per cent of bismuth may be used but we have found that it is not practicable to go beyond this limit. Thallium behaves in the same manner as bismuth and may be substituted for it in the proportions disclosed above. The most marked improvement in machining quality is seen in alloys made from aluminum containing less than about 0.3 per cent impurities. The alloys possess a tensile and yield strength comparable to those of the unalloyed aluminum as far as we have determined.

Bismuth and thallium may not only be used separately to improve the machining quality of aluminum, but they are also effective in this respect when used simultaneously. It has been ascertained that the machinability of an alloy containing both elements is often superior to that of an alloy containing an equivalent amount of only one of the metals. For example, an aluminum alloy containing about 1 per cent each of bismuth and thallium, balance aluminum, cuts more easily and leaves a better machined surface than does an aluminum containing 2 per cent of bismuth. In many cases 2 per cent or less of the two elements is sufficient to provide the desired degree of machinability but we prefer to limit the total amount to less than 6 per cent. For exceptional applications as much as 10 per cent total might be employed. Through the combined use of bismuth and thallium it is possible to obtain a better machinability with a smaller amount of added metal in the aluminum which is of importance in certain cases where only a minimum of other elements is permitted in association with the base metal, aluminum.

A further factor influencing the choice of the amount of bismuth and/or thallium to be used in a given alloy is the amount of cold working received by the alloy before machining. For example, a severely work-hardened piece of the alloy can be cut more readily than the same alloy in a soft or annealed condition. The allowance to be made for this factor can be easily determined in a few experimental tests by one skilled in the art.

The elements bismuth and thallium may be most conveniently added to molten aluminum in the solid metallic form since they melt at a temperature considerably below that of aluminum. If more than about 1.5 per cent of the heavy metals is to be added, the temperature of the molten bath should be raised above that commonly used in ordinary melting practice, the metals added, and the mass vigorously stirred before casting the alloy in suitable molds in order to obtain a uniform distribution of the heavy metals throughout the entire alloy. The method of adding such metals to aluminum here referred to is more completely described in co-pending application Serial No. 689,885, filed September 18, 1933.

The term "aluminum" used herein and in the appended claims embraces the usual impurities associated with that metal whether in small or large amount, or picked up in the course of the usual handling operations incident to ordinary melting practice.

We claim:

1. An aluminum base alloy containing about 1 per cent each of bismuth and thallium, the balance being aluminum.

2. An aluminum base alloy containing a total of between about 0.05 and 10 per cent of bismuth and thallium, comprising not less than 0.05 per cent and not more than 9.95 per cent of each, the balance being aluminum.

3. An aluminum base alloy containing a total of between about 2 per cent and 6 per cent of the elements bismuth and thallium, comprising not less than 2 per cent and not more than 4 per cent of each, the balance being aluminum.

LOUIS W. KEMPF.
WALTER A. DEAN.